(12) United States Patent
Park

(10) Patent No.: US 11,637,725 B2
(45) Date of Patent: Apr. 25, 2023

(54) TRANSCEIVING METHOD FOR PHASE NOISE COMPENSATION IN SC-FDE SCHEME, AND APPARATUS THEREFOR

(71) Applicant: ELECTRONICS AND TELECOMMUNICATIONS RESEARCH INSTITUTE, Daejeon (KR)

(72) Inventor: Hyeong Sook Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/541,143

(22) Filed: Dec. 2, 2021

(65) Prior Publication Data

US 2022/0247604 A1 Aug. 4, 2022

(30) Foreign Application Priority Data

Feb. 2, 2021 (KR) .................. 10-2021-0014548

(51) Int. Cl.
*H04L 25/03* (2006.01)
*H04L 1/00* (2006.01)

(52) U.S. Cl.
CPC ...... *H04L 25/03159* (2013.01); *H04L 1/0006* (2013.01); *H04L 25/03012* (2013.01)

(58) Field of Classification Search
CPC ............ H04L 1/0006; H04L 25/03012; H04L 25/03159
See application file for complete search history.

(56) References Cited

U.S. PATENT DOCUMENTS

| | | | |
|---|---|---|---|
| 7,936,832 B2 | 5/2011 | Ma et al. |
| 8,046,398 B2 | 10/2011 | Kang et al. |
| 8,223,887 B2 | 7/2012 | Hwang et al. |
| 9,008,094 B2 | 4/2015 | Kim et al. |
| 2020/0052944 A1 | 2/2020 | Zhang et al. |

FOREIGN PATENT DOCUMENTS

| | | |
|---|---|---|
| KR | 101275852 B1 | 6/2013 |
| KR | 1020200055376 A | 5/2020 |

*Primary Examiner* — Nader Bolourchi
(74) *Attorney, Agent, or Firm* — Rabin & Berdo, P.C.

(57) ABSTRACT

An operation method of a receiving apparatus may comprise: receiving an N-th data block belonging to a frame including a plurality of data blocks from a transmitting apparatus, each of the plurality of data blocks including a data period and a UW period; storing a first UW received in a UW period of the N-th data block in a buffer; receiving an (N+1)-th data block belonging to the frame from the transmitting apparatus; estimating a phase noise in a time domain by combining the first UW with a second UW received in a UW period of the (N+1)-th data block; and applying time-domain compensation according to the estimated phase noise to the (N+1)-th data block, and demodulating data of the (N+1)-th data block, wherein the first UW and the second UW are configured with a same sequence.

20 Claims, 9 Drawing Sheets

TRANSCEIVING METHOD FOR PHASE NOISE COMPENSATION IN SC-FDE SCHEME, AND APPARATUS THEREFOR

CROSS-REFERENCE TO RELATED APPLICATIONS

This application claims priority to Korean Patent Application No. 10-2021-0014548, filed on Feb. 2, 2021, with the Korean Intellectual Property Office (KIPO), the entire contents of which are hereby incorporated by reference.

BACKGROUND

1. Technical Field

The present disclosure relates to a phase noise compensation, and more particularly, to transceiving methods of estimating and compensating for a phase noise in data transmission/reception based on a signal carrier frequency domain equalization (SC-FDE) in a millimeter wave band, and apparatuses therefor.

2. Related Art

In order to accommodate data transmission of 100 Gbps or more, wireless communication in an ultra-high frequency band of 100 GHz or above, which can secure an ultra-wide band, is attracting attention. It is expected that importance of RF impairment factors that cause a performance degradation of baseband modulation/demodulation signals due to limitations of RF transceiver devices will increase as it goes to the ultra-high frequency band. Therefore, although a cyclic prefix orthogonal frequency division multiplexing (CP-OFDM) scheme is used in the 5G NR millimeter wave band, a new waveform reflecting the above factors may be considered in the ultra-high frequency band. The single carrier (SC) scheme can be a strong candidate in terms of a power amplifier efficiency due to its smaller peak-to-average ratio (PAPR) compared to the CP-OFDM scheme. A single carrier-frequency domain equalization (FDE) scheme, which has been introduced in the IEEE 802.11ad specifications for a 60 GHz frequency band, may become an alternative. As a frequency band increases, a high frequency oscillator is required, so a frequency multiplier is essential, and the frequency multiplier has an output frequency K times that of the input, increasing phase noise characteristics by 20 Log 10K. Such the phase noise causes a performance degradation of a system, and thus, techniques for overcoming the phase noise are required.

SUMMARY

Accordingly, exemplary embodiments of the present disclosure are directed to providing an operation method of a receiving apparatus for data reception, which can improve a performance deterioration due to a phase noise according to a SC-FDE scheme in a millimeter wave band.

Accordingly, exemplary embodiments of the present disclosure are directed to providing an operation method of a transmitting apparatus corresponding to the receiving apparatus.

Accordingly, exemplary embodiments of the present disclosure are directed to providing a configuration of the receiving apparatus.

According to a first exemplary embodiment of the present disclosure, an operation method of a receiving apparatus for receiving data in an SC-FDE scheme may comprise: receiving an N-th data block belonging to a frame including a plurality of data blocks from a transmitting apparatus, each of the plurality of data blocks including a data period and a unique word (UW) period, and N being an integer greater than or equal to 1; storing a first UW received in a UW period of the N-th data block in a buffer; receiving an (N+1)-th data block belonging to the frame from the transmitting apparatus; estimating a phase noise in a time domain by combining the first UW with a second UW received in a UW period of the (N+1)-th data block; and applying time-domain compensation according to the estimated phase noise to the (N+1)-th data block, and demodulating data of the (N+1)-th data block, wherein the first UW and the second UW are configured with a same sequence.

Each of the first UW and the second UW may be configured with a Golay sequence of a same length.

In the estimating of the phase noise, the first UW and the second UW may be combined within a window period defined by a first weight and a second weight, in a weighted combining scheme where the first weight is applied to the first UW, and the second weight is applied to the second UW.

The length of the window period may be varied within a length of the UW period by the receiving apparatus according to a modulation and coding scheme (MCS) level applied to the plurality of data blocks.

The length of the window period may increase as the MCS level applied to the plurality of data blocks corresponds to a higher-order modulation.

The length of the UW period may be varied by the transmitting apparatus according to an MCS level applied to the plurality of data blocks.

The length of the UW period may increase as the MCS level applied to the plurality of data blocks corresponds to a higher-order modulation.

When the N-th data block is a data block located first within the frame, the phase noise in the time domain may be estimated using only the first UW, and the time-domain compensation according to the estimated phase noise may be applied to the N-th data block.

According to a second exemplary embodiment of the present disclosure, an operation method of a transmitting apparatus for transmitting data in an SC-FDE scheme may comprise: transmitting an N-th data block belonging to a frame including a plurality of data blocks to a receiving apparatus, each of the plurality of data blocks including a data period and a UW period, and N being an integer greater than or equal to 1; and transmitting an (N+1)-th data block belonging to the frame to the receiving apparatus, wherein the receiving apparatus estimates a phase noise in a time domain by combining a first UW transmitted in a UW period of the N-th data block and a second UW transmitted in a UW period of the (N+1)-th data block, a time domain compensation for the estimated phase nose is applied to the (N+1)-th data block, and the first UW and the second UW are configured with a same sequence.

Each of the first UW and the second UW may be configured with a Golay sequence of a same length.

The phase noise may be estimated by combining the first UW and the second UW within a window period defined by a first weight and a second weight, in a weighted combining scheme where the first weight is applied to the first UW, and the second weight is applied to the second UW.

The length of the UW period may be varied by the transmitting apparatus according to an MCS level applied to the plurality of data blocks.

The length of the UW period may increase as the MCS level applied to the plurality of data blocks corresponds to a higher-order modulation.

According to a third exemplary embodiment of the present disclosure, a receiving apparatus for receiving data in an SC-FDE scheme may comprise: a processor; a memory storing instructions executable by the processor; and a transceiver controlled by the processor, wherein when executed by the processor, the instructions cause the processor to: receive an N-th data block belonging to a frame including a plurality of data blocks from a transmitting apparatus through the transceiver, each of the plurality of data blocks including a data period and a unique word (UW) period, and N being an integer greater than or equal to 1; store a first UW received in a UW period of the N-th data block in a buffer; receive an (N+1)-th data block belonging to the frame from the transmitting apparatus through the transceiver; estimate a phase noise in a time domain by combining the first UW with a second UW received in a UW period of the (N+1)-th data block; and apply time-domain compensation according to the estimated phase noise to the (N+1)-th data block, and demodulate data of the (N+1)-th data block, wherein the first UW and the second UW are configured with a same sequence.

Each of the first UW and the second UW may be configured with a Golay sequence of a same length.

In the estimating of the phase noise, the first UW and the second UW may be combined within a window period defined by a first weight and a second weight, in a weighted combining scheme where the first weight is applied to the first UW, and the second weight is applied to the second UW.

The length of the window period may be varied within a length of the UW period by the receiving apparatus according to a modulation and coding scheme (MCS) level applied to the plurality of data blocks.

The length of the window period may increase as the MCS level applied to the plurality of data blocks corresponds to a higher-order modulation.

The length of the UW period may be varied by the transmitting apparatus according to an MCS level applied to the plurality of data blocks.

When the N-th data block is a data block located first within the frame, the phase noise in the time domain may be estimated using only the first UW, and the time-domain compensation according to the estimated phase noise may be applied to the N-th data block.

According to exemplary embodiments of the present disclosure, a phase noise compensation performance may be improved by weight-combining some samples of a received unique word (UW) signal with samples of a previously-received UW signal when performing SC-FDE scheme-based data reception. In addition, according to exemplary embodiments of the present disclosure, by varying a UW length of an SC-FDE frame according to an MCS level in a phase noise environment of an ultra-high frequency band, the performance degradation of the high-order modulation scheme can be improved. The method of applying the variable UW length may increase some overhead for a high-order modulation scheme, but it reduces complexity of a receiver compared to the existing technology, and improves the phase noise performance for the high-order modulation scheme without additional time delays.

DETAILED DESCRIPTION OF THE EMBODIMENTS

Figure 1:
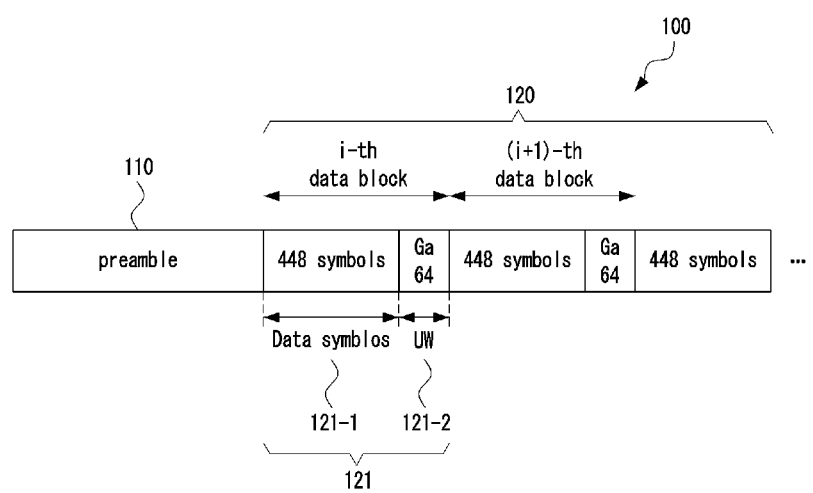
FIG. 1 is a conceptual diagram for describing an example of a frame structure applied to an SC-FDM scheme.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in greater detail with reference to the accompanying drawings.

The CP-OFDM scheme used in the 5G NR compensates for a common phase error (CPE) caused by a phase noise by introducing a phase tracking reference signal (PTRS) to compensate for the phase noise. On the other hand, it is expected that a phase noise in an ultra-high frequency band can be overcome by increasing a subcarrier spacing or using an inter-carrier interference (ICI) removal technique. However, as described above, a new waveform may be considered in the ultra-high frequency band. The single carrier (SC) scheme can be a strong candidate in terms of a power amplifier efficiency due to its smaller PAPR compared to the CP-OFDM scheme. For example, the SC-FDE scheme having been introduced in the IEEE 802.11ad specifications for a 60 GHz frequency band may become an alternative.

FIG. 1 is a conceptual diagram for describing an example of a frame structure applied to an SC-FDM scheme.

In FIG. 1, a structure of a frame 100 defined in the IEEE802.11ad specifications is shown. One frame includes a preamble 110 and a plurality of data blocks 120. Each data block (e.g., 121) includes a data period 121-1 and a unique word (UW) period 121-2. Assuming that the number of symbols per data block is 512 (i.e., N=512), one data block consists of the data period 121-1 corresponding to Ns symbols and the UW period 121-2 having a length of Ng. That is, the length N of each data block is defined as $N=N_s+N_g$. A Ga64 Golay sequence may be used as a UW, and a UW of an i-th data block may be regarded as a cyclic prefix (CP) of an (i+1)-th data block. The length Ng of the UW period may be set to be larger than a channel impulse length L. An SC-FDE reception signal $r_i=[r_{i,0}, r_{i,1}, \ldots, r_{i,N-1}]^T$ having a phase noise may be expressed as Equation 1 below.

$$r_i = P_i H x_i + n_i \quad \text{[Equation 1]}$$

Here, $P_i$ is a diagonal matrix having a size of N×N representing the phase noise. $e^{j\emptyset_{i,j}}$ is a sample value corresponding to a phase noise $\emptyset(t)$ of a received signal sample $r_{i,j}$, and $x_i=[x_{i,0}, x_{i,1}, \ldots, x_{i,N-1}]^T$ is a transmission signal of the i-th data block composed of data and a UW. $P_i$ and $x_i$ may be expressed as in Equation 2 below.

$$P_i = \text{diag}\{[e^{j\emptyset_{i,0}}, e^{j\emptyset_{i,1}}, \ldots, e^{j\emptyset_{i,N-1}}]\}$$

$$x_i=[s_i^T, u^T]^T=[s_{i,0}, s_{i,N_s-1}, u_0, \ldots, u_{N_g-1}]^T \quad \text{[Equation 2]}$$

The channel H is a circulant matrix having the size of N×N, and the first column of the channel H is $H(:,1)=[h_0, h_1, \ldots, h_{L-1}, 0_{1\times(N-L)}]^T$. If there is no phase noise, $P_i$ may be an identity matrix $I_N$ having the size of N×N, and the reception signal may be defined as $r_i=Hx_i+n_i$. A received signal for the UW $u_k(L \leq k \leq N_g-1)$ of the i-th data block may be expressed as in Equation 3 below.

$$r_{u,k} = e^{j\phi_{u,k}}\sum_{l=0}^{L-1}h_l u_{k-l} + n_{u,k} \quad \text{[Equation 3]}$$

The receiving apparatus may detect the UW signal as shown in Equation 4 by estimating $\hat{h}_l$ by using a preamble.

$$\hat{r}_{u,k} = \sum_{l=0}^{L-1}\hat{h}_l u_{k-l}, u_k(L \leq k \leq N_g - 1) \quad \text{[Equation 4]}$$

Assuming that the phase noise during the UW period is constant as $\emptyset_{u,L}= \ldots =\emptyset_{u,N_g-1}=\emptyset_i^u$, the phase noise corresponding to the UW period may be calculated as shown in $$e^{j\phi_i^u} = \frac{v_u}{|v_u|}, v_u = \frac{1}{N_g - L}\sum_{k=L}^{N_g-1}\frac{r_{u,k}\hat{r}_{u,k}^*}{|\hat{r}_{u,k}|^2 + \delta_n^2} \quad \text{[Equation 5]}$$

Assuming that the phase noise of one data block is constant, the receiving apparatus may compensate for the phase noise of the received signal $r_i$ in the time domain as shown in Equation 6 below, according to the phase noise $\hat{P}_i = \text{diag}\{[e^{j\hat{\phi}_i}1_{N\times 1}]^T\}$ estimated using the UW of the corresponding data block.

$$r_i' = \hat{P}_i^* r_i \quad \text{[Equation 6]}$$

As described above, an initial received signal $\tilde{r}_i$ may be detected as shown in Equation 7 below through a SC-FDE demodulation process on the received signal $r_i'$ for which the initial phase noise has been compensated.

$$\tilde{r}_i = F^H E F r_i' \quad \text{[Equation 7]}$$

Here, F is an FFT matrix having the size of N×N, and E is an equalizer diagonal matrix having elements $E_{n,n}=\hat{H}_n^*/(|\hat{H}_n|+\delta_n^2)$. As a performance degradation of high-order modulation schemes such as 64 QAM, which is sensitive to the phase noise, is expected, there is an algorithm that compensates for the initial phase noise as above and then improves the performance by applying decision-directed compensation techniques, or the like, but this may increase the hardware complexity and cause an additional time delay.

On the other hand, in the ultra-high frequency band, a frequency multiplier that outputs a frequency K times that of the input is used to obtain a high center frequency. Such the frequency multiplier increases the phase noise characteristics by 20 Log 10K. In order to analyze the performance degradation according to the increase in the phase noises, a phase noise model of the ultra-high frequency band was predicted by using a phase noise model used for designing the PTRS of the 5G NR.

Figure 2:
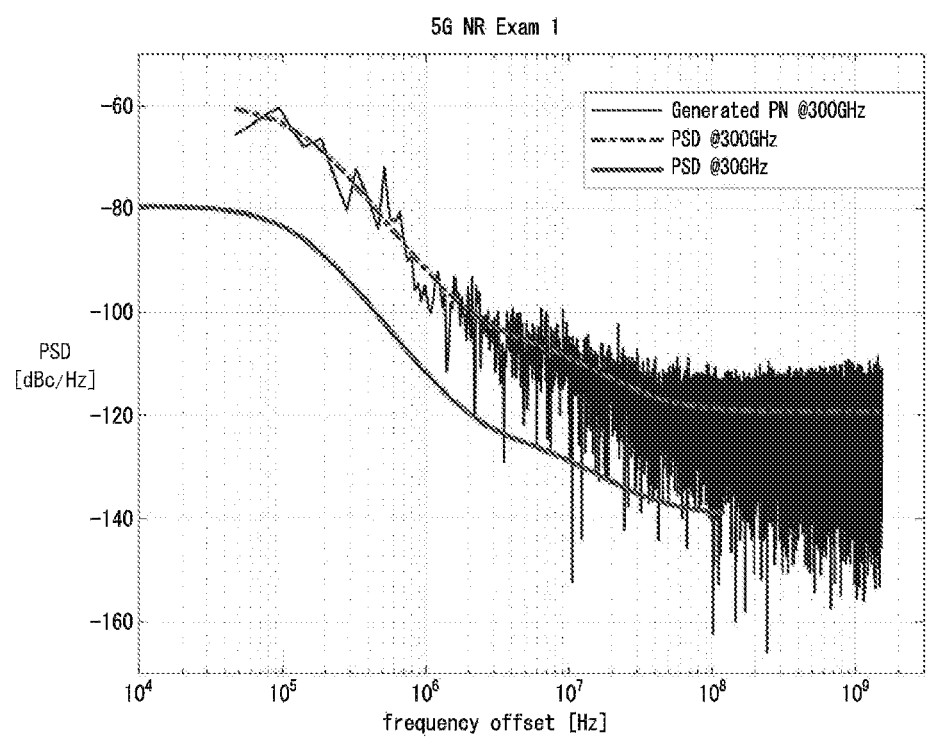
FIG. 2 is a conceptual diagram illustrating a power spectral density (PSD) according to a predicted phase noise model of an ultra-high frequency band.

FIG. 2 is a conceptual diagram illustrating a power spectral density (PSD) according to a predicted phase noise model of an ultra-high frequency band.

In FIG. 2, a solid line represents a phase noise model of a 30 GHz frequency band, and a dotted line represents a phase noise model of a 300 GHz frequency band in which a noise is increased by 20 Log 10 (300/30) than the 30 GHz frequency band. In the SC-FDE scheme according to the prior arts, a demodulation or codec output is detected with respect to a received signal in which an initial phase noise is estimated in the time domain by using a UW, and then the phase noise is iteratively estimated to improve performance. The method of using such the iterative loop in the actual receiver may increase hardware complexity and causes a time delay, making it difficult to apply to the actual receiver.

Figure 3:
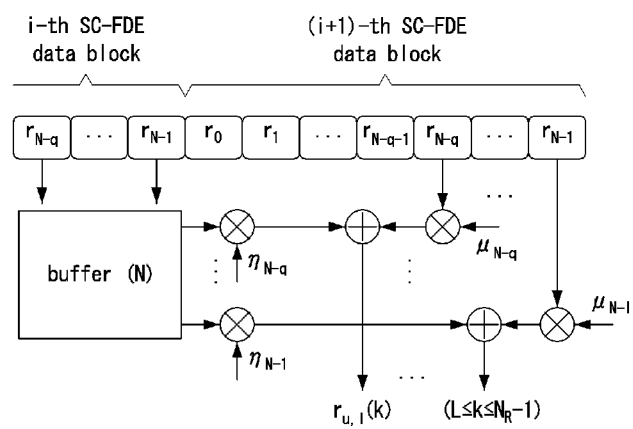
FIG. 3 is a conceptual diagram illustrating a data reception method in which a phase noise is compensated in the SC-FDE scheme according to an exemplary embodiment of the present disclosure.

FIG. 3 is a conceptual diagram illustrating a data reception method in which a phase noise is compensated in the SC-FDE scheme according to an exemplary embodiment of the present disclosure.

Referring to FIG. 3, in an exemplary embodiment of the present disclosure, in order to increase a detection reliability of the UW in the time domain when estimating a phase noise in the time domain by using the UW of the SC-FDE scheme, the same UW may be transmitted in every data block. That is, the UW of the (i−1)-th data block may be stored in a buffer, and it may be used by being combined with the UW of the i-th data block. This may be expressed as Equation 8 below. However, the zero-th data block (i.e., a data block located first within a frame) may use only the UW of the corresponding data block.

$$\bar{r}_i = \bar{r}_i(n) = \begin{cases} r_i(n), & 0 \leq n \leq N-q-1 \\ \mu_n r_i(n) + \eta_n r_{i-1}(n), & N-q \leq n \leq N-1 \end{cases} \quad \text{[Equation 8]}$$

In Equation 8, a weighted combining scheme may be used in the process of combining the UW signals of two data blocks. That is, a first weight $\mu_n$ may be applied to the UW of the i-th data block and a second weight $\eta_n$ may be applied to the UW of the (i−1)-th data block. These weights may be set in various ways. For example, in case of a general rectangular window, they may be set as $\eta_{N-n}=0$, $\mu_n=1$. For a constant window, they may be set as $$\eta_{N-n} = \frac{1}{2}, \mu_n = \frac{1}{2}.$$

In generalized expression, the weights respectively applied to the (i−1)-th data block and the i-th data block may be expressed as in Equation 9 below. That is, the period $n \in [-q, -1]$ may indicate the UW period of the (i−1)-th data block, the period $n \in [0, N-q-1]$ may indicate the data period of the i-th data block, and the period $n \in [N-q, N-1]$ may indicate the UW period of the i-th data block.

$$w_n = \begin{cases} \eta_{N-n}, & \text{if } n \in [-q, -1] \\ 1, & \text{if } n \in [0, N-q-1] \\ \mu_n, & \text{if } n \in [N-q, N-1] \\ 0, & o/w \end{cases} \quad \text{[Equation 9]}$$

Here, the first data block within the corresponding frame may use only the UW of the corresponding data block, and the above-described scheme of combining the UWs may be applied from the second data block within the corresponding frame. Accordingly, such the method does not require an additional time delay and may be expressed by Equation 10 below.

$$r_{u,i}(k)=\eta_k r_{u,i-1}(k)+\mu_k r_{u,i}(k), L \leq k \leq N_g \quad \text{[Equation 10]}$$

Hereinafter, the following simulation parameters are used to examine the performance of the SC-FDE scheme in presence of a 300 GHz band phase noise.

Carrier frequency: 300 GHz
Sampling frequency: 3.072 GHz
FFT size: N=Ns+Ng, (512=448+64), (1024=448*2+64*2)
Modulation and coding scheme (MCS): 16 QAM 2/3, 64 QAM 2/3
Channel coding: Turbo code
Channel estimation: preambles are used FIG. 4 is a conceptual diagram illustrating a BLER performance of the SC-FDE scheme using an algorithm of the prior arts.

Figure 4:
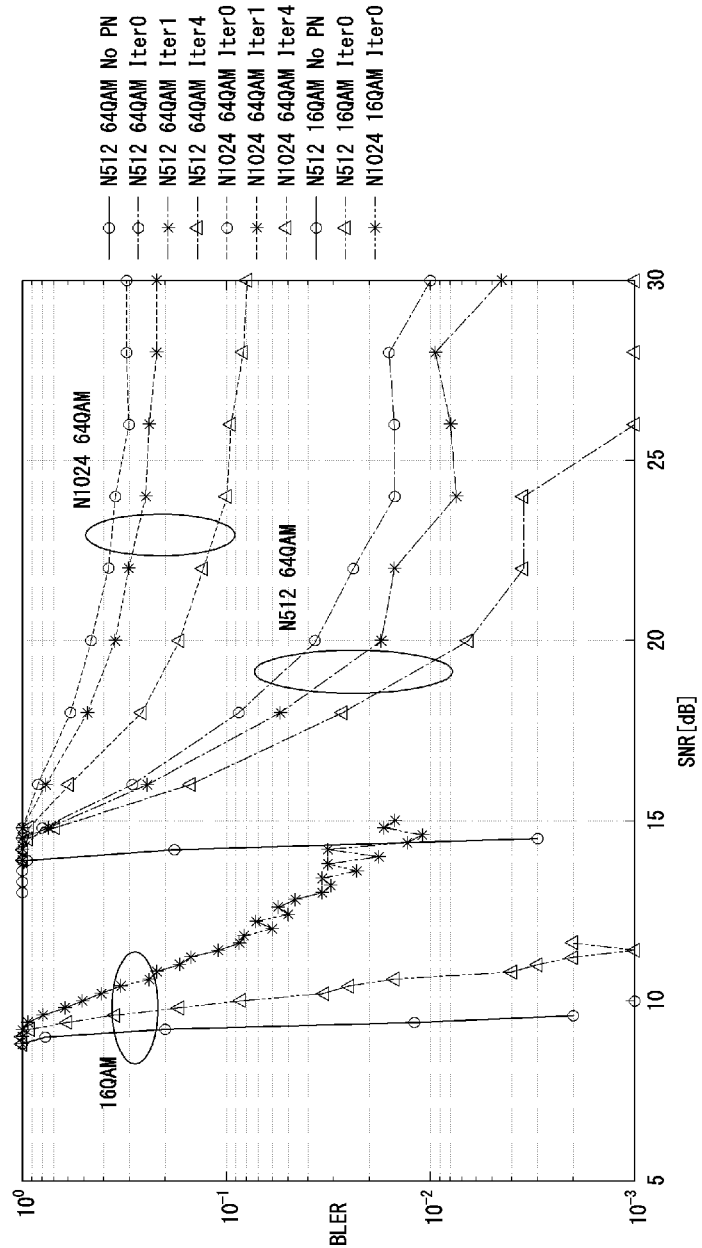
FIG. 4 is a conceptual diagram illustrating a BLER performance of the SC-FDE scheme using an algorithm of the prior arts.

Referring to FIG. 4, when an algorithm according to the prior arts is applied to the 16 QAM and 64 QAM MCS levels, it can be seen that the performance is improved as the number of iterations (i.e., Iter in FIG. 4) increases. Here, Iter0 represents a case in which only the initial phase noise compensation is performed as in Equation 7. Although the performance with respect to the phase noise can be improved by the above-described structure, hardware complexity may increase, and an additional time delay may occur.

In an exemplary embodiment of the present disclosure, two windows as shown in Equations below may be used to combine received UW signal samples by giving weights thereto. Equation 11 represents a constant window, and Equation 12 represents a window having approximate optimal combining weights.

$$\begin{cases} \mu_n = \frac{1}{2} \\ \eta_n = 1 - \mu_n \end{cases}, \forall n \in [N-q, N-1] \quad \text{[Equation 11]}$$

$$\begin{cases} \mu_n = \alpha + (N-1-n)\beta \\ \eta_n = 1 - \mu_n \end{cases}, \forall n \in [N-q, N-1], \quad \text{[Equation 12]}$$

where $\beta = \dfrac{2\pi f_p T_s - 2\pi N f_p^2 T_s^2}{1 - e^{-2\pi f_p N T_s} - \dfrac{2\pi}{3N} f_p T_s}, \alpha = \dfrac{1}{2} - \dfrac{1}{2}(q-1)\beta$ The combining weights in Equation 12 are weights used to combine CPs in the OFDM scheme when a phase noise is present. For details, the previous paper [Chun-Ying Ma, et. al., "A Simple ICI suppression Method Utilizing Cyclic Prefix for OFDM Systems in the presence of Phase noise", IEEE Trans. Communication., vol. 61, no. 11, November 2013] may be referred. In Equation 12, $T_s$ is a sampling time, and $f_p$ is a pole frequency of a one pole/one zero phase noise model, and may be obtained through a specification of a VCO or measurement.

Figure 5:
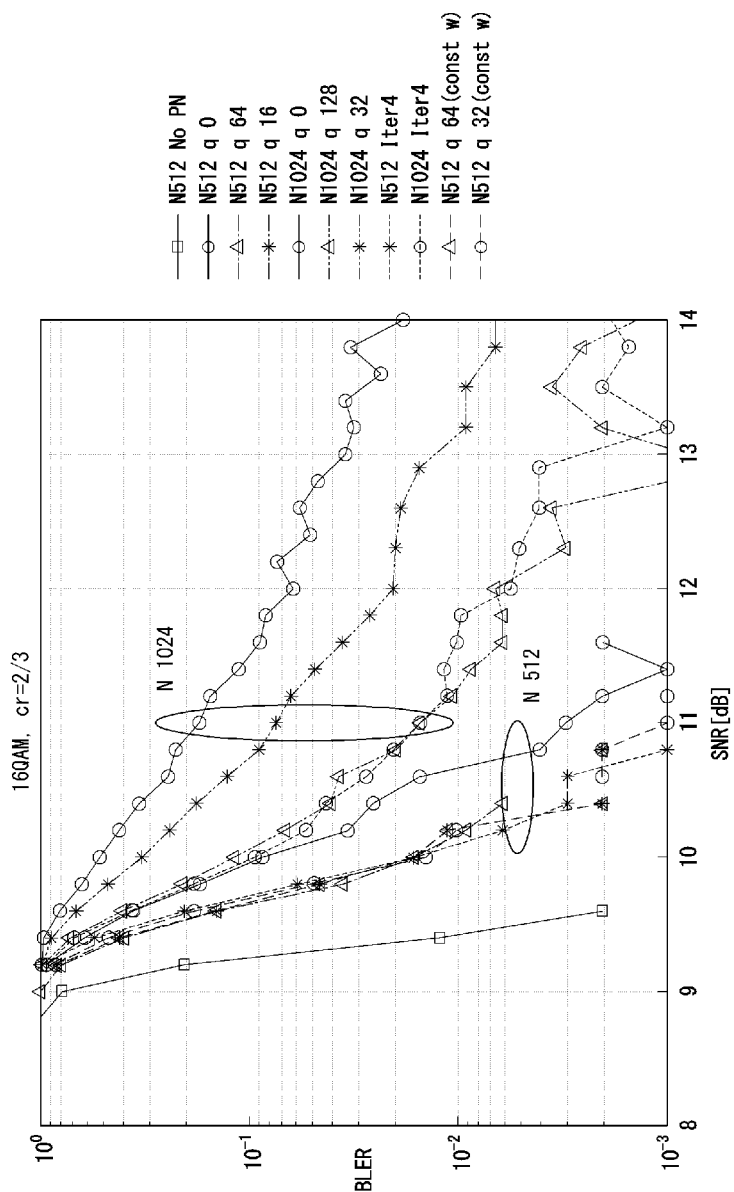
FIG. 5 is a graph illustrating a BLER performance when 16 QAM and a coding rate of 2/3 are applied in a data receiving method according to an exemplary embodiment of the present disclosure.
Figure 6:
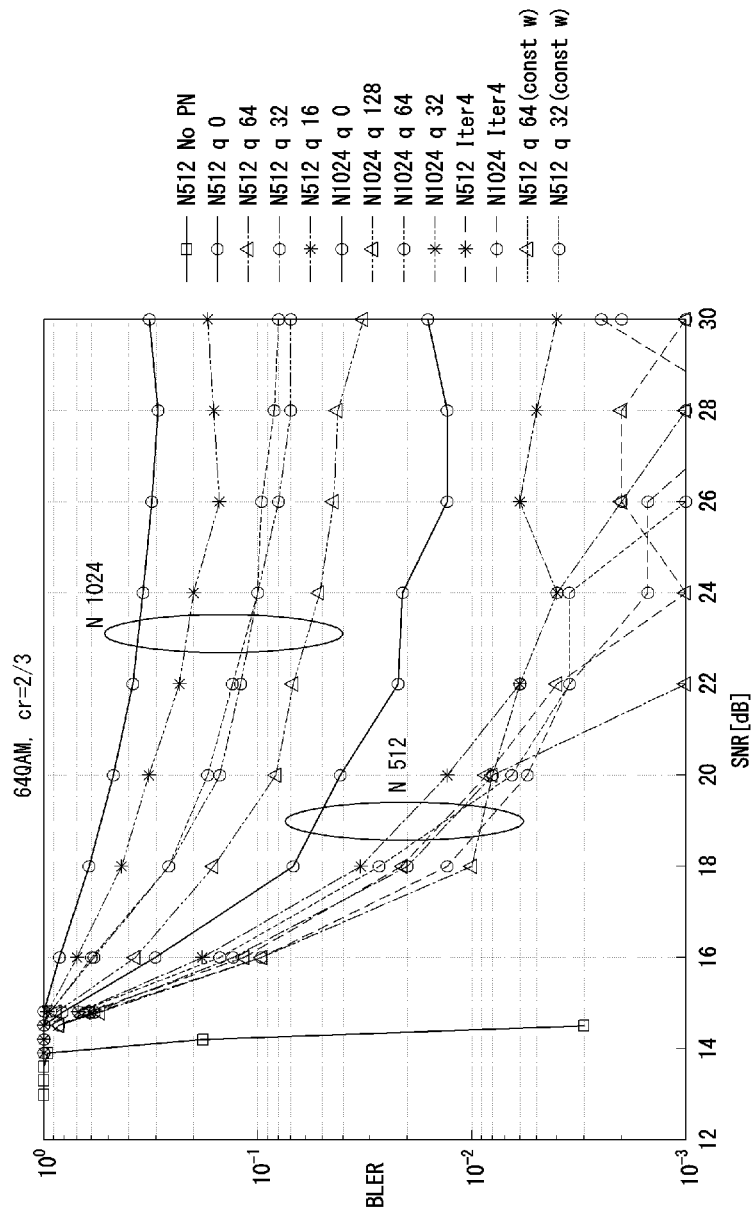
FIG. 6 is a graph illustrating a BLER performance when 64 QAM and a coding rate of 2/3 are applied in a data receiving method according to an exemplary embodiment of the present disclosure.

FIG. 5 is a graph illustrating a BLER performance when 16 QAM and a coding rate of 2/3 are applied in a data receiving method according to an exemplary embodiment of the present disclosure, and FIG. 6 is a graph illustrating a BLER performance when 64 QAM and a coding rate of 2/3 are applied in a data receiving method according to an exemplary embodiment of the present disclosure.

In FIGS. 5 and 6, for comparison between the performance according to the existing algorithm and the performance according to an exemplary embodiment of the present disclosure, BLER performance results corresponding to Iter4 of FIG. 4 are shown, and BLER performance results corresponding to different window lengths (i.e., q) when N=512 are shown. Also, BLER performance results corresponding to different window lengths (i.e., q) when N=1024 are shown. Further, a case where a phase noise does not exist (i.e., solid line (□)) and a case where only the initial phase noise of Equation 6 is compensated (i.e., solid line (o)) are shown.

Referring to FIGS. 5 and 6, 16 QAM satisfies a BLER $10^{-2}$ or higher even when N is 1024, and 64 QAM sufficiently satisfies a BLER $10^{-2}$ when N=512, but when N=1024, it can be seen that the performance is about a BLER of $10^{-1}$. Therefore, since the performance varies according to the window length q, if the UW length is set to Ng according to a channel delay spread, the window length may be determined based on the determined UW length Ng by selecting a parameter at the receiving apparatus. If a higher-order modulation scheme is selected and the Ng length is selected longer, the window length q may be selected to be larger, so that a transmission frame can be generated by adjusting the basic UW length Ng according to the MCS level. For example, if Ng in case of 16 QAM is defined as Ng=Ng1, Ng in case of 64 QAM may be expressed as Ng2. In this case, they may have a relationship of Ng2>Ng1 This may be expressed by Equation 13 below. As an example, n may be as n=0,1,2.

$$N_{g1}=N_g+nK_g, n=0,1,2 \qquad \text{[Equation 13]}$$

Since a Golay sequence is used as the UW in the SC-FDE packet configuration, Kg may be a Golay sequence having a length of 8. Since the FFT size N is fixed, the data length Ns may change according to the UW length Ng, resulting in additional overhead. Accordingly, the length of the UW variable according to the MCS level may be predefined.

Figure 7:
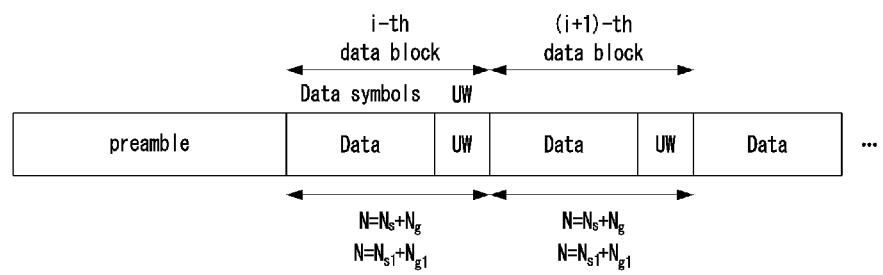
FIG. 7 is a conceptual diagram illustrating a structure of an SC-FDE packet having a variable UW length according to an exemplary embodiment of the present disclosure.

FIG. 7 is a conceptual diagram illustrating a structure of an SC-FDE packet having a variable UW length according to an exemplary embodiment of the present disclosure, and Table 1 shows an example of a table defining a variable UW length according to an MCS level $I_{MCS}$. In Table 1, $MCS_1$, $MCS_2$, and $MCS_3$ may be defined according to a modulation scheme and a code rate.

TABLE 1

| Scheduled MCS | UW length |
| --- | --- |
| $I_{MCS} < MCS_1$ | $N_g$ |
| $MCS_1 < I_{MCS} < MCS_2$ | $N_g + K_g$ |
| $MCS_2 < I_{MCS} < MCS_3$ | $N_g + 2*K_s$ |

In general, it is expected that the UW length will increase when an MCS level above 64 QAM is used. According to Equation 13 described above, the length of the data symbol may also be varied as in Equation 14 below.

$$N_{s1}=N_s-nK_g, n=0,1,2 \qquad \text{[Equation 14]}$$

Figure 8:
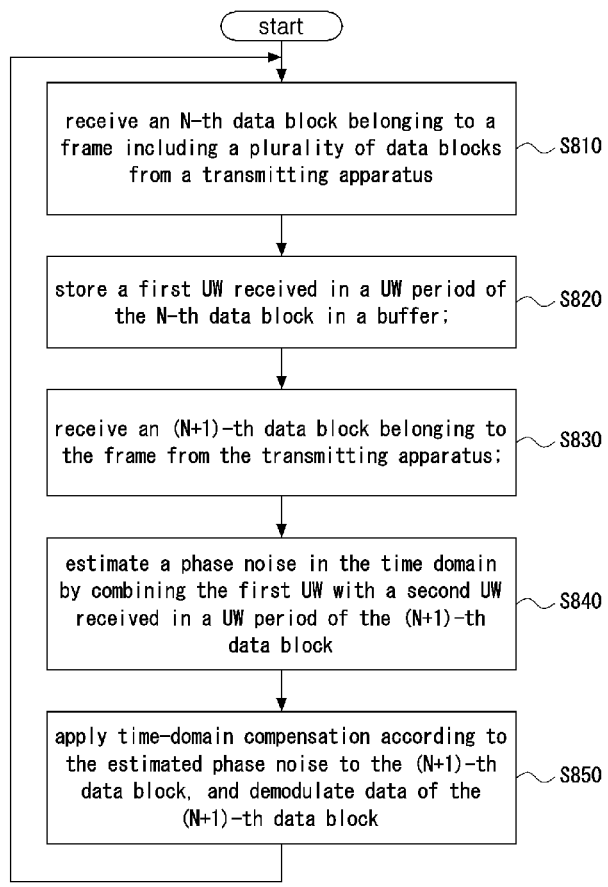
FIG. 8 is a flowchart specifically illustrating a data receiving method according to an exemplary embodiment of the present disclosure.

FIG. 8 is a flowchart specifically illustrating a data receiving method according to an exemplary embodiment of the present disclosure. The data receiving method described with reference to FIG. 8 is an operation method performed by the receiving apparatus.

Referring to FIG. 8, the receiving apparatus may receive an N-th (i.e., N is an integer greater than or equal to 1) data block belonging to a frame including a plurality of data blocks from the transmitting apparatus (S810). In this case, as described above with reference to FIG. 1, the frame may include a preamble and a plurality of data blocks. Each data block may include the data period 121-1 and the UW period 121-2. Then, the receiving apparatus may store a first UW received in the UW period of the N-th data block in a buffer (S820). Then, the receiving apparatus may receive an (N+1)-th data block belonging to the frame from the transmitting apparatus (S830).

Then, the receiving apparatus may estimate a phase noise in the time domain by combining the first UW of the N-th data block and the second UW received in the UW period of the (N+1)-th data block (S840). The first UW and the second UW may be configured with the same sequence. For example, the first UW and the second UW may be configured with the same Golay sequence having the same length. The combining of the first UW and the second UW performed in the step S840 may be performed in a weighted combining scheme in which a first weight is applied to the first UW and a second weight is applied to the second UW. That is, the first UW and the second UW may be combined within a window period defined by the first weight and the second weight.

In this case, the first weight and the second weight may be combined within a window defined by Equation 11, for example. Alternatively, the first weight and the second weight may be combined within a window defined by Equation 12, for example. In exemplary embodiments of the present disclosure, the first weight and the second weight may be variously set without being limited to Equations 11 and 12 above. Meanwhile, the estimation of the phase noise performed in the step S840 may be performed based on Equation 5 described above.

Finally, the receiving apparatus may apply the time domain compensation according to the estimated phase noise to the (N+1)-th data block and demodulate the data of the (N+1)-th data block (S850). Application of the time domain compensation may be performed based on Equation 6 described above, and demodulation of the data of the (N+1)-th data block may be performed based on Equation 7 described above.

After performing the step S850, the receiving apparatus may perform the steps S810 to S850 for the (N+1)-th data block and an (N+2)-th data block, and the steps S810 to S850 may also be performed for the subsequent data blocks.

Meanwhile, as described with reference to FIGS. 5 and 6, the length of the window period may be varied by the receiving apparatus within the length of the UW period according to an MCS level applied to the plurality of data blocks. In addition to or replacing the length adjustment of the window period by the receiving apparatus, the length of the UW period may be varied by the transmitting apparatus according to the MCS level applied to the plurality of data blocks.

The length of the window period or the length of the UW period may be varied to increase as the MCS level applied to the plurality of data blocks corresponds to a higher order modulation. Meanwhile, when the N-th data block is a data block located first in the frame, the phase noise in the time domain may be estimated using only the first UW, and the time domain compensation according to the estimated phase noise may be performed on the N-th data. Although the operation method of the receiving apparatus has been described in FIG. 8, the transmitting apparatus that transmits a frame to the receiving apparatus may perform an operation corresponding to the operation method of the receiving apparatus.

Figure 9:
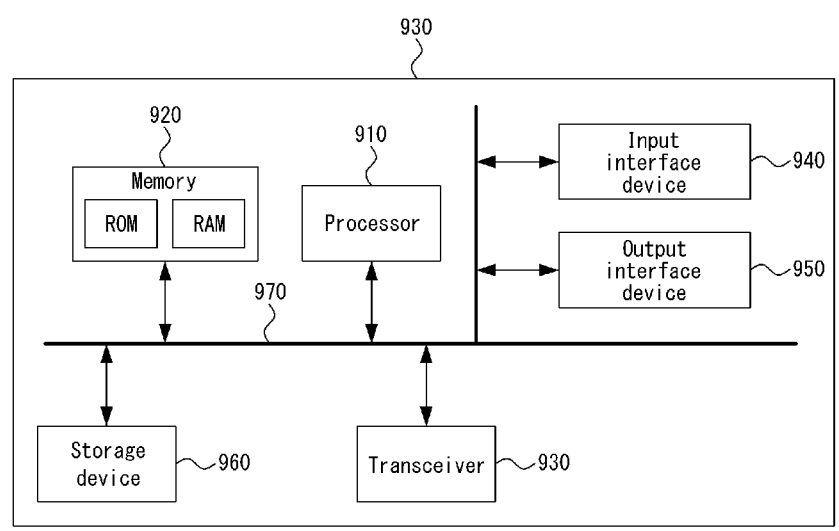
FIG. 9 is a block diagram illustrating an exemplary embodiment of a receiving apparatus performing the data receiving method according to exemplary embodiments of the present disclosure.

FIG. 9 is a block diagram illustrating an exemplary embodiment of a receiving apparatus performing the data receiving method according to exemplary embodiments of the present disclosure.

Referring to FIG. 9, a communication node 900 may comprise at least one processor 910, a memory 920, and a transceiver 930 receiving a frame transmitted by a transmitting apparatus. Also, the communication node 900 may further comprise an input interface device 940, an output interface device 950, a storage device 960, and the like. The respective components included in the communication node 900 may communicate with each other as connected through a bus 970.

However, each component included in the communication node 900 may be connected to the processor 910 via an individual interface or a separate bus, rather than the common bus 970. For example, the processor 910 may be connected to at least one of the memory 920, the transceiver 930, the input interface device 940, the output interface device 950, and the storage device 960 via a dedicated interface.

The processor 910 may execute a program stored in at least one of the memory 920 and the storage device 960. The processor 910 may refer to a central processing unit (CPU), a graphics processing unit (GPU), or a dedicated processor on which methods in accordance with embodiments of the present disclosure are performed. Each of the memory 920 and the storage device 960 may be constituted by at least one of a volatile storage medium and a non-volatile storage medium. For example, the memory 920 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a receiving apparatus for receiving data in a single carrier frequency domain equalization (SC-FDE) scheme, the operation method comprising:
receiving an N-th data block belonging to a frame including a plurality of data blocks from a transmitting apparatus, each of the plurality of data blocks including a data period and a unique word (UW) period, and N being an integer greater than or equal to 1;
storing a first UW received in a UW period of the N-th data block in a buffer;
receiving an (N+1)-th data block belonging to the frame from the transmitting apparatus;
estimating a phase noise in a time domain by combining the first UW with a second UW received in a UW period of the (N+1)-th data block; and
applying time-domain compensation according to the estimated phase noise to the (N+1)-th data block, and demodulating data of the (N+1)-th data block,
wherein the first UW and the second UW are configured with a same sequence, and configured to have a same UW period length.

2. The operation method according to claim 1, wherein each of the first UW and the second UW is configured with a Golay sequence of a same length.

3. The operation method according to claim 1, wherein in the estimating of the phase noise, the first UW and the second UW are combined within a window period defined by a first weight and a second weight, in a weighted combining scheme where the first weight is applied to the first UW, and the second weight is applied to the second UW.

4. The operation method according to claim 3, wherein a length of the window period is varied within the UW period length by the receiving apparatus according to a modulation and coding scheme (MCS) level applied to the plurality of data blocks.

5. The operation method according to claim 4, wherein the length of the window period increases as the MCS level applied to the plurality of data blocks corresponds to a higher-order modulation.

6. The operation method according to claim 1, wherein the UW period length is varied by the transmitting apparatus according to an MCS level applied to the plurality of data blocks.

7. The operation method according to claim 6, wherein the UW period length increases as the MCS level applied to the plurality of data blocks corresponds to a higher-order modulation.

8. The operation method according to claim 1, wherein when the N-th data block is a data block located first within the frame, the phase noise in the time domain is estimated using only the first UW, and the time-domain compensation according to the estimated phase noise is applied to the N-th data block.

9. An operation method of a transmitting apparatus for transmitting data in a single carrier frequency domain equalization (SC-FDE) scheme, the operation method comprising:
transmitting an N-th data block belonging to a frame including a plurality of data blocks to a receiving apparatus, each of the plurality of data blocks including a data period and a unique word (UW) period, and N being an integer greater than or equal to 1; and
transmitting an (N+1)-th data block belonging to the frame to the receiving apparatus,
wherein the receiving apparatus estimates a phase noise in a time domain by combining a first UW transmitted in a UW period of the N-th data block and a second UW transmitted in a UW period of the (N+1)-th data block, a time domain compensation for the estimated phase nose is applied to the (N+1)-th data block, and the first UW and the second UW are configured with a same sequence, and configured to have a same UW period length.

10. The operation method according to claim 9, wherein each of the first UW and the second UW is configured with a Golay sequence of a same length.

11. The operation method according to claim 9, wherein the phase noise is estimated by combining the first UW and the second UW within a window period defined by a first weight and a second weight, in a weighted combining scheme where the first weight is applied to the first UW, and the second weight is applied to the second UW.

12. The operation method according to claim 11, wherein the UW period length is varied by the transmitting apparatus according to an MCS level applied to the plurality of data blocks.

13. The operation method according to claim 12, wherein the UW period length increases as the MCS level applied to the plurality of data blocks corresponds to a higher-order modulation.

14. A receiving apparatus for receiving data in a single carrier frequency domain equalization (SC-FDE) scheme, the receiving apparatus comprising:
a processor;
a memory storing instructions executable by the processor; and
a transceiver controlled by the processor,
wherein when executed by the processor, the instructions cause the processor to:
receive an N-th data block belonging to a frame including a plurality of data blocks from a transmitting apparatus through the transceiver, each of the plurality of data blocks including a data period and a unique word (UW) period, and N being an integer greater than or equal to 1;
store a first UW received in a UW period of the N-th data block in a buffer;
receive an (N+1)-th data block belonging to the frame from the transmitting apparatus through the transceiver;
estimate a phase noise in a time domain by combining the first UW with a second UW received in a UW period of the (N+1)-th data block; and
apply time-domain compensation according to the estimated phase noise to the (N+1)-th data block, and demodulate data of the (N+1)-th data block,
wherein the first UW and the second UW are configured with a same sequence, and configured to have a same UW period length.

15. The receiving apparatus according to claim 14, wherein each of the first UW and the second UW is configured with a Golay sequence of a same length.

16. The receiving apparatus according to claim 14, wherein in the estimating of the phase noise, the first UW and the second UW are combined within a window period defined by a first weight and a second weight, in a weighted combining scheme where the first weight is applied to the first UW, and the second weight is applied to the second UW.

17. The receiving apparatus according to claim 16, wherein a length of the window period is varied within the UW period length by the receiving apparatus according to a modulation and coding scheme (MCS) level applied to the plurality of data blocks.

18. The receiving apparatus according to claim 17, wherein the length of the window period increases as the MCS level applied to the plurality of data blocks corresponds to a higher-order modulation.

19. The receiving apparatus according to claim 14, wherein the UW period length is varied by the transmitting apparatus according to an MCS level applied to the plurality of data blocks.

20. The receiving apparatus according to claim 14, wherein when the N-th data block is a data block located first within the frame, the phase noise in the time domain is estimated using only the first UW, and the time-domain compensation according to the estimated phase noise is applied to the N-th data block.

* * * * *